US005486016A

United States Patent [19]

Godin et al.

[11] Patent Number: 5,486,016

[45] Date of Patent: Jan. 23, 1996

[54] WHEEL ASSEMBLY FOR A WHEELCHAIR, INCORPORATING A CHANGE SPEED HUB

[75] Inventors: Gary Godin, 16 Francois Street, Paul Bernard Subdivision, Charlo, N.B. E0B 1M0; Philip Lambert, Fredericton, both of Canada

[73] Assignee: Gary Godin, Charlo, Canada

[21] Appl. No.: 235,273

[22] Filed: Apr. 29, 1994

[30] Foreign Application Priority Data

May 6, 1993 [CA] Canada .................................. 2095681

[51] Int. Cl.[6] ............................ A61G 5/00; B60K 41/22; B62M 1/14

[52] U.S. Cl. ....................... 280/250.1; 192/6 A; 280/236; 280/238; 297/423.29; 297/423.35

[58] Field of Search ................................ 280/250.1, 244, 280/253, 255, 257, 258, 236, 238; 192/6 A; 297/423.29, 423.35

[56] References Cited

U.S. PATENT DOCUMENTS

| | | | |
|---|---|---|---|
| 4,176,879 | 12/1979 | Rodaway . | |
| 4,462,605 | 7/1984 | Morgan et al. . | |
| 4,489,955 | 12/1984 | Hamilton . | |
| 4,727,965 | 3/1988 | Zach et al. | 192/6 A |
| 4,762,332 | 8/1988 | Seol . | |
| 4,988,114 | 1/1991 | Thornton, Jr. et al. . | |
| 5,167,168 | 12/1992 | Beumer | 280/250.1 |
| 5,328,266 | 10/1994 | Roth et al. | 297/423.35 |
| 5,362,081 | 11/1994 | Beidler et al. | 280/250.1 |

*Primary Examiner*—Mitchell J. Hill
*Attorney, Agent, or Firm*—McFadden, Fincham

[57] ABSTRACT

For use on a wheelchair, a wheel assembly has a change speed gear mounted in the wheel hub. A handwheel is connected to the input of the speed gear and the output of the speed gear is connected to the hub. A free wheel device can be provided between the handwheel and the speed gear. To prevent unwanted backward movement, a clutch assembly can be provided. The clutch assembly engages with a member attached to the hub and permits forward movement only. The clutch can be disengageable. The footrests of the wheelchair can be pivoted up and down by a hand lever mounted on the wheelchair and connected, as by a cable, to a lever on the footrest. A hand lever is provided on each side of the wheelchair.

2 Claims, 6 Drawing Sheets

WHEEL ASSEMBLY FOR A WHEELCHAIR, INCORPORATING A CHANGE SPEED HUB

This invention relates to change speed hubs, for wheelchairs. Also, the invention relates to anti-backup apparatus for wheelchairs, and to a footrest lifting apparatus.

BACKGROUND OF THE INVENTION

Wheelchairs are often propelled by the user's gripping and pushing on a circular member or handwheel attached to the outside of each wheel, of a diameter sightly smaller than that of the wheel. There is a direct drive from the handwheel to the chair wheel.

Certain disadvantages occur, such as when moving uphill, or downhill, or up and down ramps. In particular, moving uphill can present considerable difficulty to the user, in that the user may not have sufficient strength to move the handwheels, and thus the chair wheels. Also, when moving uphill a safety factor can occur in that there is the strong possibility of a wheelchair tending to run backwards, downhill, if the user loses hold on the handwheel, or for other causes.

Further, difficulty can be experienced in getting in and out of chairs in that the footrests obstruct any easy access and egress. Pivotally mounted footrests are provided but it is usually extremely difficult and often impossible for the user to pivot the footrest up and down, particularly when the user is sitting in the chair.

SUMMARY OF THE INVENTION

The present invention provides a multiple gear hub in the wheels of a wheelchair, the gearing being between the handwheel and the chair wheel. The handwheel is attached to one member of a multiple gear hub, the chair wheel is attached to the hub, with the gearing between the two, connecting the handwheel and the wheel in a multiple gear ratio arrangement. Control means are provided for the user to change the gear ratio. In a particular arrangement, handwheel and chair wheel are connected by what can be considered as a Regular Gear, which can be geared down to a Power Gear for incline. A two speed gear hub can be used, or for example a three speed gear. In the latter case only two gears need be used. Alternatively the third gear can have a "geared up" relationship which could be useful for extended travel on a level surface, particulary for young, strong, users. Various forms of control for the gearing can be provided.

Thus in accordance with one particular embodiment of the invention there is provided, a wheel assembly for a wheelchair, comprising a hollow hub; a wheel mounted on the hub; an axle extending through the hub, the axle having inner and outer ends; means rotatably mounting the hub on the axle; means for fixedly mounting the axle at its inner end on a frame member of a wheelchair; means mounting a handwheel on the outer end of the axle; a multiple speed gear assembly mounted in the hub, an output of the gear assembly connected to the hub and an input of the gear assembly connected to the handwheel, the gear assembly including gear change actuating means, and means for moving the actuating means as desired to change the gear.

Undesired backward movement can be prevented by an anti-backup clutch on each wheel. The clutch can normally be in position during general use and permits forward movement of a wheelchair, but any tendency to move backwards immediately actuates the clutch and prevents backward movement of the wheel and thus of the chair. To permit backward movement of the wheelchair, when desired, the clutch can be withdrawn or disengaged as desired. Various ways of withdrawing and reapplying the clutch can be provided.

Thus in accordance with another aspect of the invention there is provided a wheel assembly for a wheelchair, comprising: a hollow hub; a wheel mounted on the hub, an axle extending through the hub and means rotatably mounting the hub on the axle; a clutch assembly for mounting on the wheelchair adjacent to the hub and including a clutch member for engagement with the hub and rotation therewith, the clutch assembly permitting forward rotation of the hub and preventing reverse rotation of the hub.

The footrests can be pivoted up out of the way by levers positioned at the armrests and actuated by the chair user, if desired. Movement of levers in one direction pivots the footrests up and movement in the other direction pivots the footrest down.

BRIEF DESCRIPTION OF THE DRAWINGS

The various aspects of the invention can be readily understood by the following description of certain embodiments, by way of example, in conjunction with the accompanying drawings, in which.

DESCRIPTION OF PREFERRED EMBODIMENTS

Figure 1:
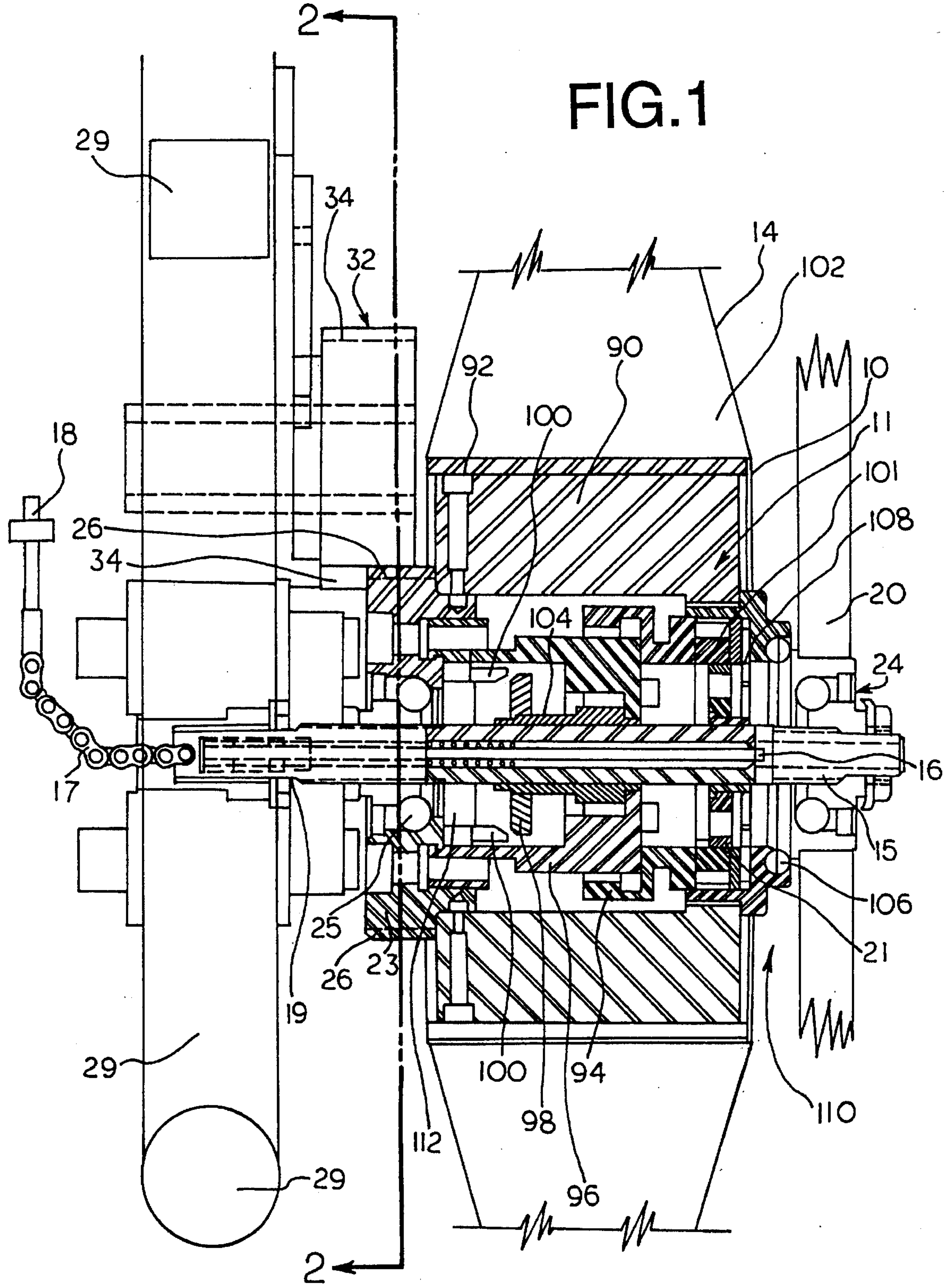
FIG. 1 is a vertical cross-section through one form of multiple gear hub, and associated chair parts, generally on the line 1—1 of FIG. 2, also illustrating one form of anti-backup apparatus.
Figure 2:
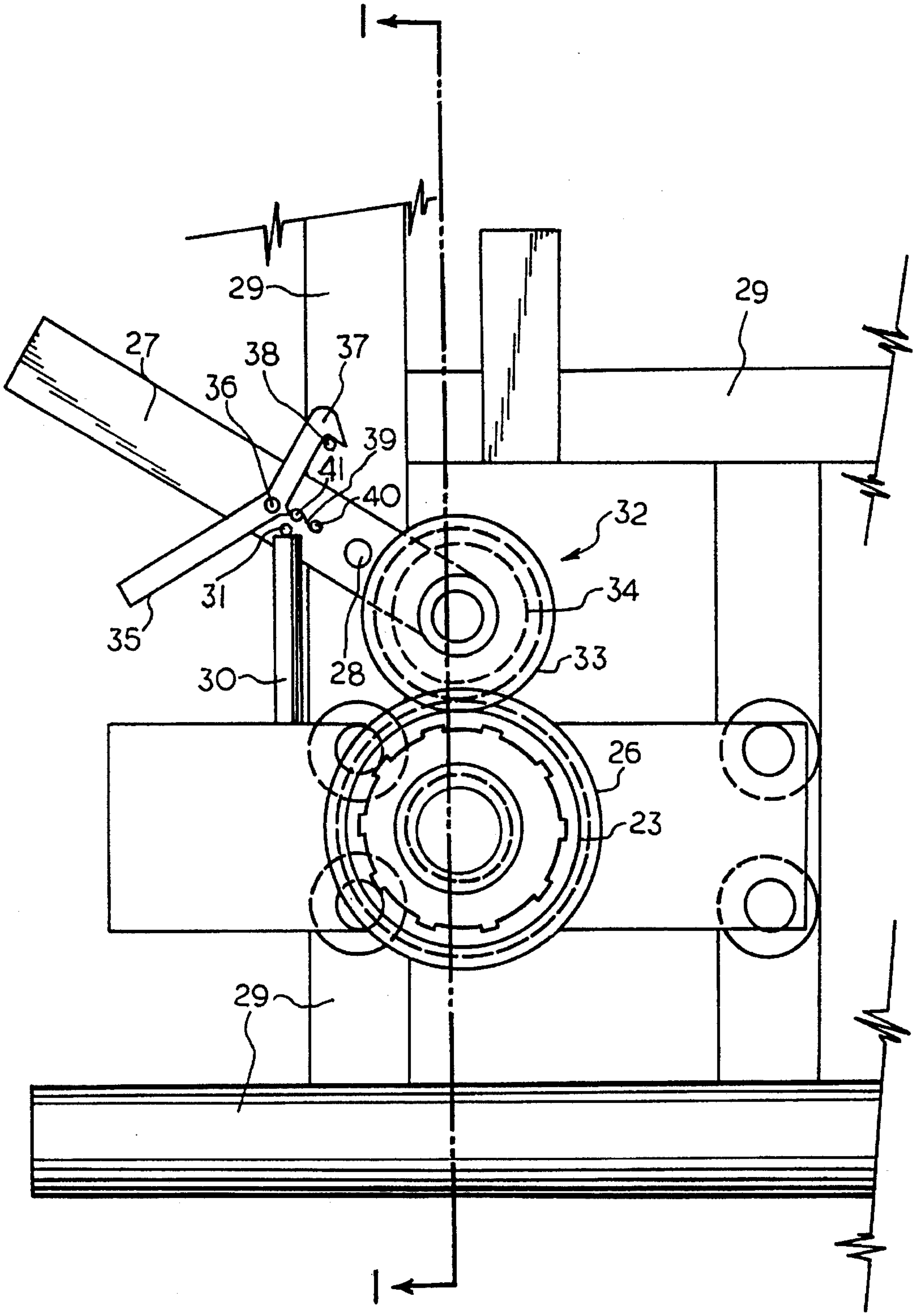
FIG. 2 is a side view of the arrangement of FIG. 1, generally on the line 2—2 of FIG. 1.

FIGS. 1 and 2 illustrate the arrangement of a wheel hub indicated generally at 10, in which is positioned a multiple gear assembly indicated generally at 11. This is one form of a planetary gear system in which axially slidable members engage selectively with gears mounted in the hub. The gear assembly 11 includes a spacer 90 beneath hub 10. The spacer 90 further includes a socket head cap screw 92. A ring gear 94 is disposed approximately centrally of the mechanism and more specifically outside of planet gear cage 96. A secondary clutch 98 is slidably movable on axle 15 and capable of disengaging drive pawls 100, a plurality of the latter being disposed in spaced apart relation about axle 15. A plurality of planet gear pins 102 retain the planet gears in the planet gear cage 96. The sun gear is denoted by numeral 104. A ball bearing race 106 is provided; drive ring 108 is provided for second and third gears, which meshes at all times with the hub. Ball race 106 includes a ball and cage assembly 110. A plurality of bearings 112 provide adjacent drive pawls 100.

The chair wheel 14 is mounted by the hub 10. The hub in turn is mounted via the multiple speed gear assembly, discussed hereinabove, on the axle 15, the hub being connected to the Output member of the gear assembly. The axle is hollow and the gear actuating rod 16 extends through the axle to move the axially slidable gears. The rod is moved by short link chain 17 and in turn this moved by a cable 18. Mounted on the outer end of the axle 15 is a handwheel 20. At its inner end the axle is mounted at 19 on the chair frame 29. The drive from the handwheel is via a clutch assembly 21 to the input member of the multiple gear assembly 11, and then to the hub 10 and thus the chair wheel 14.

The handwheel 20, hub 10 and gear are mounted on the axle 15 at each end by bearings 24 and 25. In the example of FIGS. 1 and 2, the outer bearing race 23 of the bearing 25 is formed with gear teeth 26 on its outer periphery. This member is also connected to the hub 10 and rotates with it.

In FIG. 2, a lever 27 is pivotally mounted at 28 on part of the chair frame 29. A tension spring 30 extends between a part of the chair frame and a pin 31 on the lever. At its inner end the lever carries a clutch assembly 32. The outer member 33 of the clutch assembly has gear teeth 34 for engaging with the gear teeth 26. The clutch assembly, which is a known, readily available clutch assembly, normally referred to as an "off the shelf" part, permits rotation in one direction but not in the other. Thus assuming that in FIG. 2, clockwise rotation of the outer teeth 26 and the chair wheel 14 is in order but reverse rotation not acceptable, then the clutch assembly permits anti-clockwise rotation of the outer member 33 but prevents clockwise rotation of member 33 and anti-clockwise rotation of edge 26.

The clutch 32, with lever 27 is held against disengagement, as would tend to occur when the wheel 14, with the bearing race 23 attempt to rotate anti-clockwise, that is backwards, the lever is held in position by a latch 35. Latch 35 is pivoted at 36 on the lever 27 and has a hooked end 37 which engages with a pin 38 on the chair frame 29. The latch is urged into engagement with the pin 38 by a leaf spring 39 having one end resting against the pin 40 on lever 27 and its other end pushing against the latch 35 after passing around an intermediate pin 41.

To release the anti-rollback lever 27, such as when a chair is to be manually moved rearwards, the latch 35 is rotated, anti-clockwise in FIG. 2, to disengage from pin 38. The lever 27 is then pivoted, anti-clockwise in FIG. 2, to lift the clutch assembly 32 out of engagement with the bearing race 26. The lever, and clutch, is reengaged by pushing up the outer lever end, the latch 35 reengaging.

The description of the wheel, hub gear and clutch assembly, in conjunction with FIGS. 1 and 2, is for one wheel of a wheelchair. In the example, it would be the left handwheel relative to a person in a wheelchair. A similar hub, gear and clutch mechanism would be provided for the other wheel, being a reverse arrangement considering FIGS. 1 and 2. Thus the wheel and hub would be on the opposite side of chair frame, compared to FIG. 1, the handle 20 being outside of the wheel 14. The permitted and non-permitted rotation of the wheel bearing race 26 and clutch member 33 would be the reverse as compared to FIG. 2. A side view on the lever 27, latch 35 would be a mirror image of FIG. 2.

FIGS. 1 and 2 illustrate one arrangement for the gear hub, in which the gear changes by a chain 17 and a flexible cable 18 and also one arrangement of an anti-rollback or anti-backup apparatus having a latch and lever engaging and disengaging operation.

Figure 3:
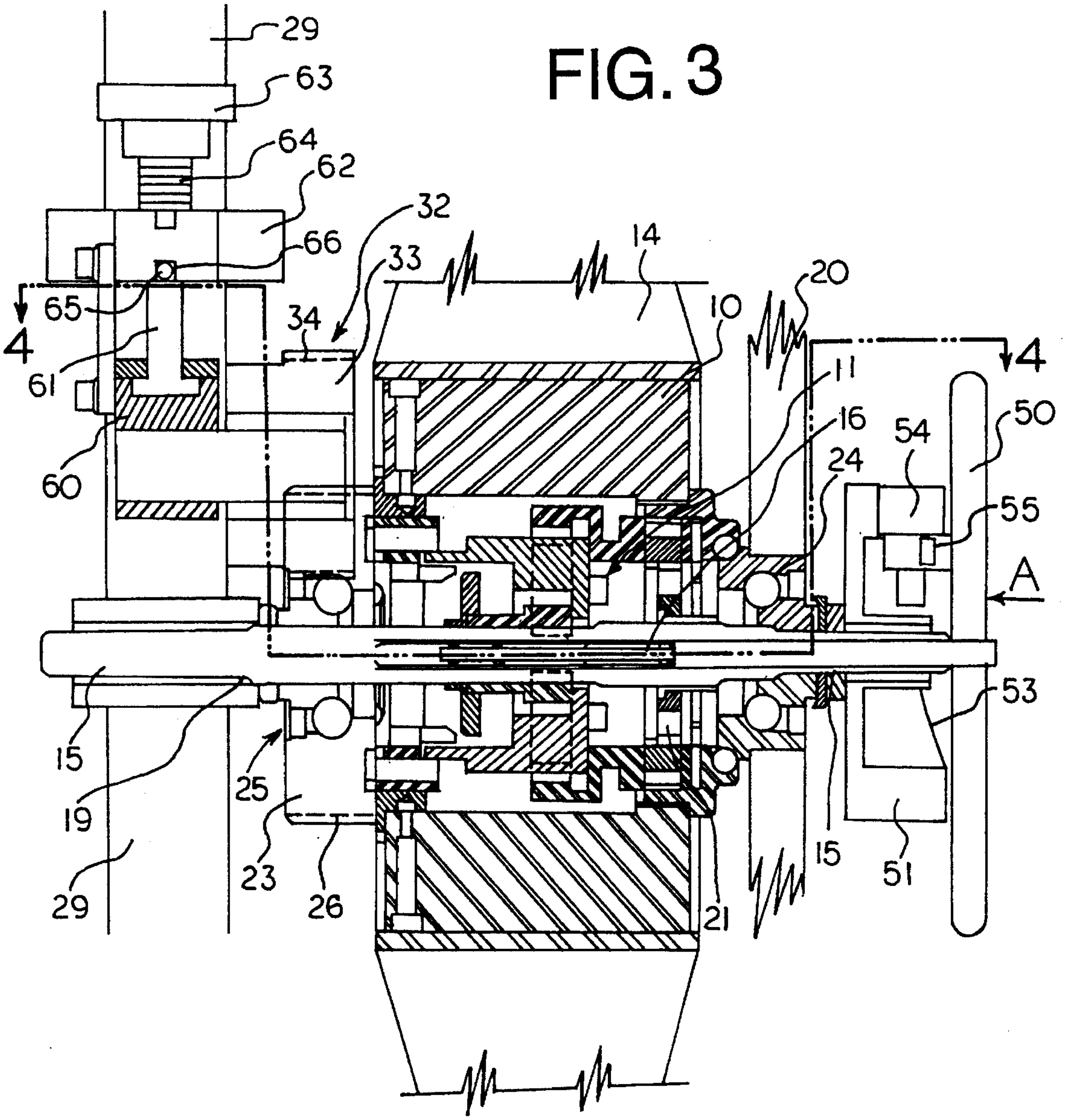
FIG. 3 is a vertical cross-section through another form of multiple gear hub, and associated chair parts, generally on the line 3—3 of FIG. 4 and also illustrating another form of anti-backup apparatus.
Figure 4:
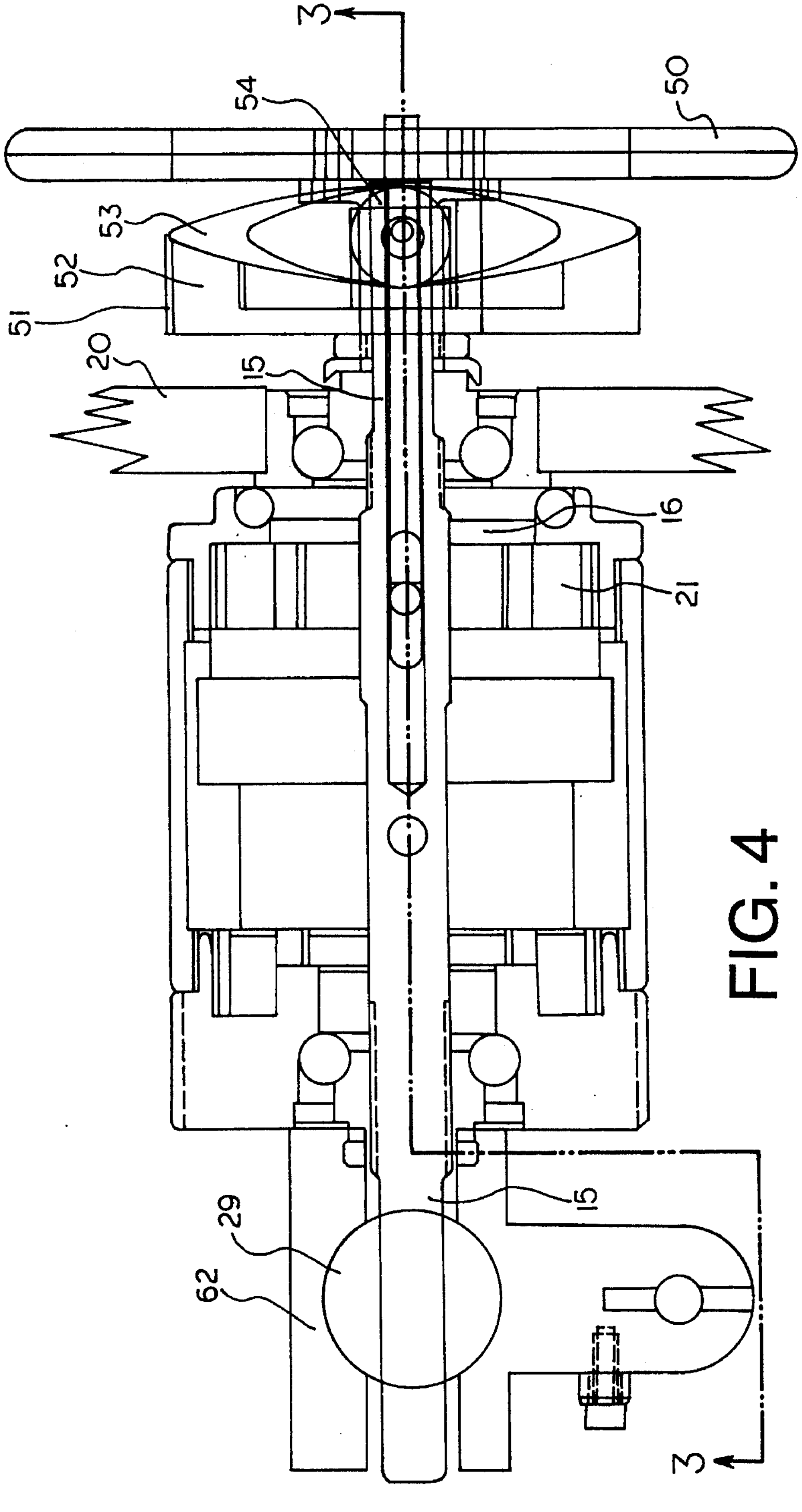
FIG. 4 is a top view in horizontal cross-section, generally on the line 4—4 of FIG. 3.
Figure 5:
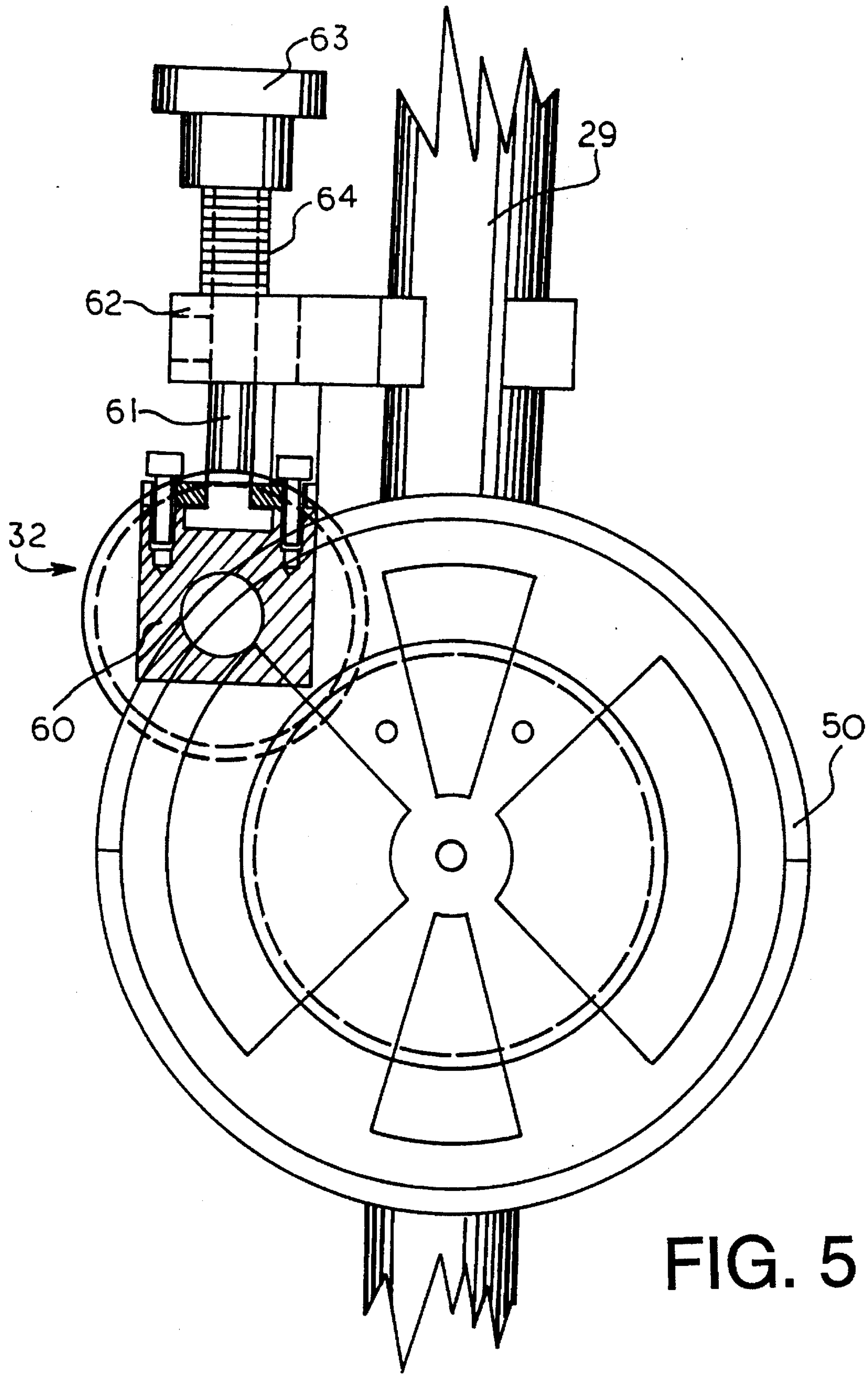
FIG. 5 is a side view in the direction of arrow A in FIG. 3.

FIGS. 3, 4 and 5 illustrate an alternative arrangement of gear hub in which gear changes obtained by rotatable handwheel cooperating with a cam surface to cause axial movement of the gear actuating rod. These Figures also illustrate an alternative form of anti-back-up apparatus in which a clutch assembly is moved out of engagement by directly pulling the clutch assembly away from the hub.

FIG. 3 is a similar cross-section to that of FIG. 1 and where applicable common reference numerals have been used, FIG. 4 being a top view in horizontal cross-section. FIG. 5 is a view in the direction of arrow A in FIG. 3. The wheel 14, handwheel 20 and hub 10 and gear assembly 11 are similar to those in FIGS. 1 and 2. However, in the embodiment of FIGS. 3, 4 and 5, the gear change is actuated by a hand operated gear change wheel 50. Gear change wheel 50 is attached to the outer end of the actuating rod 16. Carried on the end of the axle 15 is a cam member 51. Cam member 51 is a tubular member, having a cam surface 53 on the outer facing surface of the wall or tube end, i.e. the annular surface facing the wheel 50. A roller 54 is mounted on the gear change wheel 50 via a bracket 55 and engages with the cam surface 53.

If the gear change wheel is rotated relative to the cam member 51, a roller moves along the cam surface 53, the gear change wheel moving axially as the roller moves along the cam surface. Axial movement of the gear change wheel moves the actuating rod 16 and thus changes gear.

In the embodiment of FIGS. 3, 4 and 5, the outer race 23 of the bearing 25 has gear teeth 26 and a clutch assembly 32 has gear teeth 34 on its outer member 33 for engagement with the gear teeth 26 in a similar manner to that in FIGS. 1 and 2, but the clutch assembly is mounted differently. The clutch assembly is mounted in a block 60 which in turn is mounted on the lower or inner end of a shaft 61 slidably supported in a bracket 62 mounted on part of the chair frame 29. On the upper or outer end of the shaft 61 is a knob 63 and positioned between the knob 63 and the bracket 62 is a compression spring 64.

The compression spring 64 biases the knob 63, shaft 61 and block 60 upwards. The shaft 61 is held against such movement by a pin 65 which extends through the pin with its ends positioned in a slot 66 in the bottom surface of the bracket 62. Some downward movement of the shaft 61 can occur even when the gears 26 and 34 are engaged. This downward movement frees the pin 65 from the slot 66. This permits rotation of the shaft 61 by the knob 63 and the pin enters and moves up a further slot, not shown, in the bracket 62. This disengages the clutch assembly from the hub. Conversely, pushing down on the knob reengages the clutch assembly and rotation of knob and shaft reengages the pin 65 in slot 66.

As in the description of the embodiments illustrated in FIGS. 1 and 2, FIGS. 3, 4 and 5 are for one side of the wheelchair and a reverse arrangement is provided for the other side. The operation of the clutch assembly 32 in FIGS. 3, 4 and 5 is the same as in FIGS. 1 and 2.

Two embodiments of the change gear hub are illustrated in FIGS. 1 and 2 and in FIGS. 3, 4 and 5. Also two embodiments of anti-backup apparatus have been illustrated. Depending upon the requirements, the various assemblies or formal apparatus can be provided individually or in any desired combination. Thus either gear hub can be provided, with or without an anti-backup apparatus. Either form of anti-backup apparatus can be provided, with or without any form of speed gear hub. To some extent, the actual form of anti-backup device used, if provided, can be decided by the particular structure of the chair frame. Some minor variations in the control and actuation of the anti-backup apparatus can arise to meet variations in the chair frame. Similarly, some minor variations can occur in the gear hub to allow for variations in the chair structure; various other means for varying the shaft rod may be employed.

In operation and in partial summary of the above, shift rod 16 runs through the centre of hollow axle 15. Shift chain 17 is connected to one end of the shift rod. Pulling on the chain shifts the mechanism from 1st gear to 2nd gear. Pulling further shifts the mechanism from 2nd gear to 3rd gear. A compression spring, located inside the hollow axle, causes the mechanism to return to 2nd gear then to 1st gear when the pulling force is removed from the shift chain. In use, the shift chain is connected to a shift lever which holds the mechnanism in the selected gear until the lever is moved.

Clutches 98 and 21 are connected to the shift rod by means of pins passing through slotted holes in the axle. The drive is fixed to handwheel 20.

In 1st gear as shown in FIG. 1, clutch 21 is holding pawls, which are pivotally fixed to the ring gear, out of engagement with drive ring 108. Thus, in the 1st gear position, ring gear 94 is free to rotate independently of drive ring 108. When handwheel 20 is rotated it rotates driver 24 which is engated with, and therefore rotates, clutch 21. Clutch 21 engages lugs on the inside of ring gear 94, thus, the ring gear rotates which, through its engagement with the planet gears, causes planet gear cage 96 to rotate. Pawls 100 are pivotally fixed to the planet gear cage and engage drive ring (23) causing it to rotate. Since drive ring 23 is fixed to the hub and the hub is fixed to the wheel, rotating handwheel 20 causes the wheel to turn, the ratio of input speed to output speed being determined by the relative dimensions and numbers of teeth of the ring, planet and sun gears.

2nd gear: Pulling shift chain 17 moves shift rod 16 which in turn moves clutches 21 and 98 axially. Movement of clutch 21 causes the pawls fixed to ring gear 94 to engage drive ring 108 while movement of clutch 98 causes pawls 100 fixed to planet gear cage 96 to disengage from drive ring 23. Therefore, when handhweel 20 is rotated, driver 24 is rotated, which rotates clutch 21, which engages lugs on the inside of ring gear 94 rotating it, which rotates drive ring 108 by way of the pawls. The hub and wheel rotate with drive ring 108. This arrangement gives a 1:1 input speed to output speed ratio.

3rd gear: Pulling shift chain 17 further, thus moving shift rod 16, clutch 21 and clutch 98 further, causes clutch 21 to disengage from the lugs on the inside of ring gear 94 and to engage with planet gear pins 102. Therefore, when handwheel 20 is rotated, driver 24 is rotated, this rotates clutch 21 which rotates planet gear cage 96. The rotation of planet gear cage 96 causes the ring gear to rotate which in turn rotates the drive ring, the hub and the wheel. Again the ratio of input speed to output speed is determined by the relative dimensions and numbers of teeth of the ring, planet and sun gears.

To ease the difficulty of getting into and out of a wheelchair, it is convenient to provide footrests that can be folded or pivoted up, out of the way. Normally this is done manually, usually by some other person. Once a wheelchair user is in a chair and the footrests are down, it is not easy, and very often impossible, for that person to raise the footrests, to get out of the chair. Also, when a person gets into the chair, it is not easy and sometimes impossible for the user to put the footrests down once they are in the chair.

Figure 7:
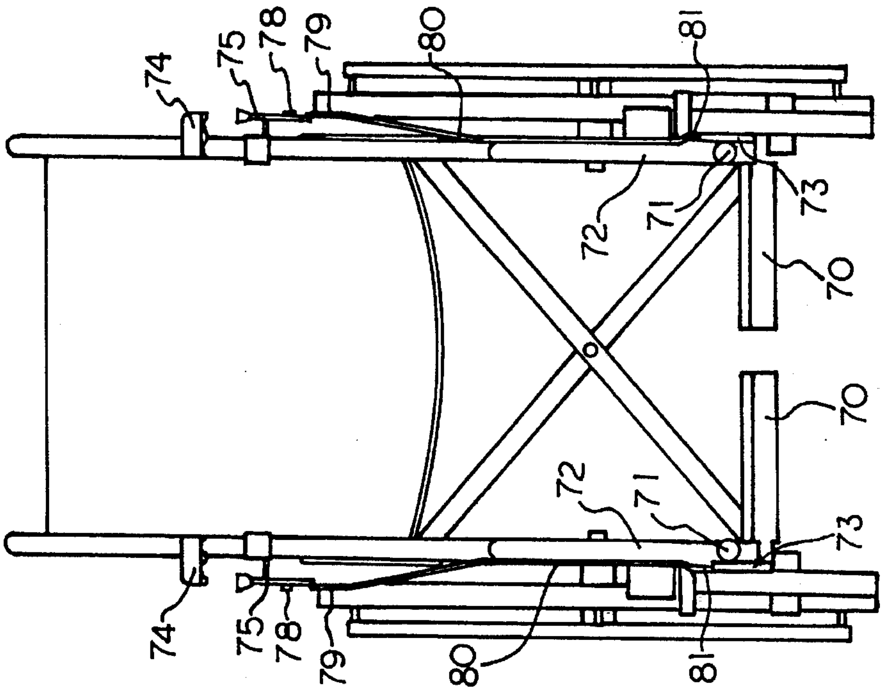
FIG. 7 is a front view of the wheelchair of FIG. 6, showing lifting apparatus on each side of the chair.
Figure 6:
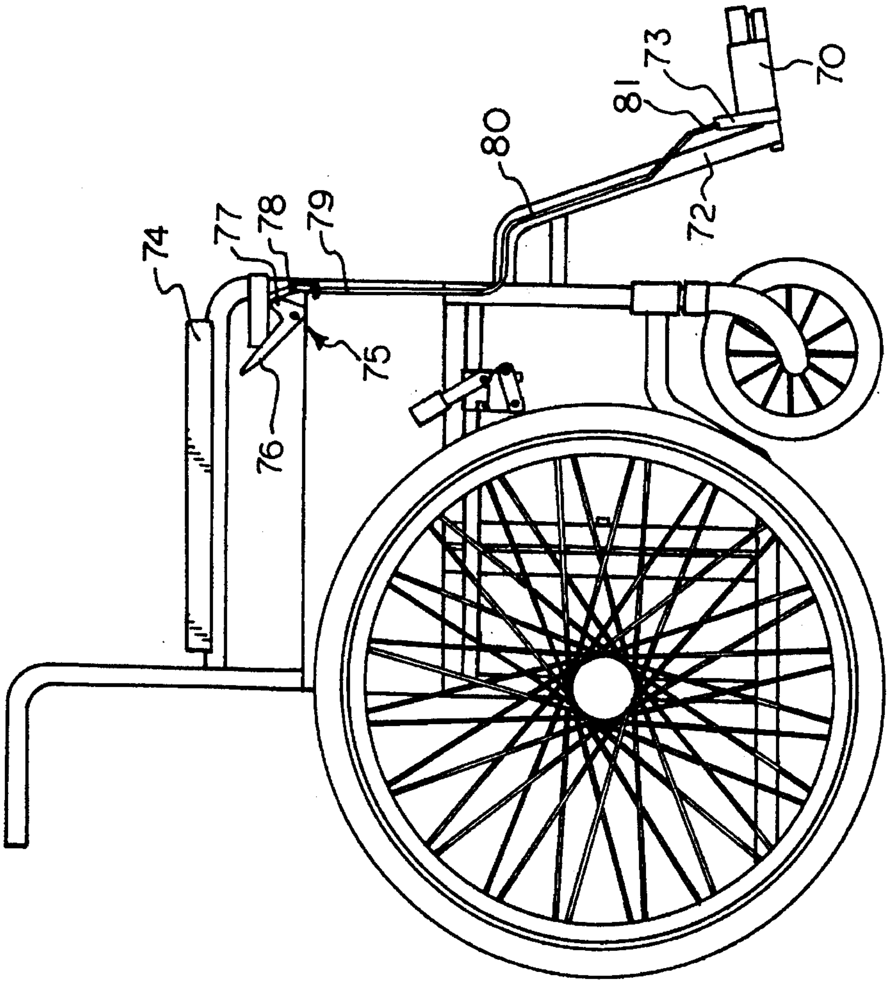
FIG. 6 is a side view of the wheelchair with a footrest lifting apparatus.

FIGS. 6 and 7 illustrate an arrangement by which a wheelchair user can raise and lower footrests themselves. The footrest 70 are pivotally mounted at 71, on the wheelchair frame 72. At the outer end of each footrest a lever 73 extends upwards. At an upper part of the wheelchair frame 72, for example just below the front ends of the armrests 74, there are mounted actuating levers 75. The levers 75, are in the example, of bell-crank form, one leg 76 being moved by the hand of a user and the other leg 77 having a connection 78 to the upper end 79 of a flexible cable member 80. At its lower end 81 the cable is attached to the upper end of lever 73.

As viewed in FIG. 6, forward movement of the leg 76 of a lever 75 moves down the connection 78 and cable 80; this causes the upper end of the lever 73 to move out and down, pivoting up the footrest 70. Reverse action of the lever 75 pivots the footrest down. Actuation of the levers 75 is readily obtained by a person in a wheelchair. Also, it makes it possible for a user to pivot up footrests before they get into a chair as no bending down in required. It also makes is easier and more convenient to attendants and other persons helping wheelchair users.

We claim:

1. A wheel assembly for a wheelchair having a frame member on each side of the seat, comprising:
   - a hollow hub;
   - a wheel mounted on said hub;
   - an axle extending through said hub, said axle having inner and outer ends, and means rotatably mounting said hub on said axle;
   - means for fixedly mounting said axle at its inner end on a frame member of a wheelchair;
   - means mounting a handwheel on said outer end of said axle;
   - a multiple speed gear assembly including pawls mounted in said hub, an output of said gear assembly connected to said hub and in input of the gear assembly connected to said handwheel, said gear assembly including axially stationary sun, planet and ring gears and having gears interconnected via said multiple speed gear assembly for both forward and reverse driving, and including gear change actuating means, each group of said pawls being engaged and disengaged by an inside-hub clutch movable by said gear change actuating means and means for moving said actuating means as desired to engage or disengage said clutches thereby change said gear; and
   - including a free wheel assembly positioned between said handwheel and said input to said gear assembly, to provide a one-way drive from said handwheel to said gear assembly for forward and reverse operation.

2. A wheel assembly for a wheelchair having a frame member on each side of the sear, comprising:
   - a hollow hub;
   - a wheel mounted on said hub;
   - an axle extending through said hub, said axle having inner and outer ends, and means rotatably mounting said hub on said axle;
   - means for fixedly mounting said axle at its inner end on a frame member of a wheelchair;
   - means mounting a handwheel on said outer end of said axle;
   - a multiple speed gear assembly including pawls mounted in said hub, an output of said gear assembly connected to said hub and an input of the gear assembly connected to said handwheel, said gear assembly including axially stationary sun, planet and ring gears and having gears interconnected via multiple groups of pawls for both forward and reverse driving, and including gear change actuating means, each group of said pawls being engaged and disengaged by an inside-hub clutch movable by said gear change actuating means and means for moving said actuating means as desired to engage or disengage said clutches thereby change said gear; and including a free wheel assembly positioned between said handwheel and said input to said gear assembly, to provide a one-way drive from said handwheel to said gear assembly for forward and reverse operation and with actuating means comprising a rod extending axially in said axle, said rod connected to said gear assembly, and means for moving said rod axially for causing a gear change, said means for moving said rod including a gear change wheel attached to an outer end of said rod, a tubular cam member mounted on an outer end of said axle between said gear change wheel and said handwheel, a cam surface on said cam member, facing towards said gear change wheel and means on said gear change wheel in contact with said cam surface, whereby rotation of said gear change wheel relative to said cam member moves said gear change wheel and said rod axially to cause said gear change.

* * * * *